United States Patent Office 3,780,098
Patented Dec. 18, 1973

3,780,098
PROCESS FOR OXIDIZING CYCLOHEXANONE AND CYCLOOCTANONE
Wyndham Morris, Manchester, England, assignor to Imperial Chemical Industries Limited, London, England
No Drawing. Filed Mar. 7, 1969, Ser. No. 805,369
Claims priority, application Great Britain, Mar. 13, 1968, 12,232/68
Int. Cl. C07c 51/18, 55/04
U.S. Cl. 260—531 R                                16 Claims

ABSTRACT OF THE DISCLOSURE

Production of aliphatic $\alpha$-$\omega$-dicarboxylic acids e.g. adipic acid by oxidizing aliphatic ketones or ketone/alcohol mixtures in liquid phase with molecular oxygen gas using a catalyst consisting of a combination of a vanadium compound with a compound of at least one of the metals cobalt, iron, manganese or copper. Acetic acid is a preferred solvent. The process is advantageously operated in two or more steps, with the temperature in the first step higher than in subsequent steps.

---

This invention relates to the manufacture of aliphatic alpha-omega dicarboxylic acids, particularly adipic acid, which are used as intermediates in the manufacture of the polyamides known as nylons, for example polyhexamethyleneadipamide (nylon 6:6).

It is known to manufacture alpha-omega aliphatic dicarboxylic acids by oxidizing with nitric acid cyclic alcohols and/or ketones, for example mixtures of alcohols and ketones prepared by air oxidation of the corresponding cycloalkanes. Adipic acid is manufactured commercially by nitric acid oxidation of "KA," that is the product consisting mainly of cyclohexanol and cyclohexanone which is obtained by air oxidation of cyclohexane.

Processes have also been proposed for oxidizing cyclic ketones, if desired in admixture with cyclic alcohols, to aliphatic alpha-omega dicarboxylic acids by treatment with oxygen-containing gases in presence of a catalyst. Despite their inherent attractiveness such proposed processes have hitherto not proved to be of commercial interest and the nitric acid oxidation process is generally preferred on economic grounds.

According to the invention a process for the production of an aliphatic alpha-omega dicarboxylic acid comprises contacting a cycloaliphatic ketone in liquid phase with molecular oxygen in the presence of a catalyst comprising compounds of vanadium and of at least one of the metals cobalt iron, manganese and copper.

The cycloaliphatic ketone used in the process of the invention may be in admixture with its corresponding alcohols, for example there may be used a mixture containing ketone and alcohol obtained by the oxidation of a cycloalkane. The invention is of particular value for the production of adipic acid from cyclohexanone or from "KA oil."

Advantageously in the process the liquid phase may be a solution in an aliphatic monobasic acid, particularly one of 2 to 5 carbon atoms, e.g. propionic and especially acetic acid.

Proportions of vanadium to other metal in the catalyst may be for example 1 atom of vanadium for each 0.1 to 10 (especially 1 to 4) atoms of other metal or metals.

The catalyst is preferably in a form which is soluble in the liquid phase. When acetic acid solvent is used mixtures of acetates and/or acetylacetonates may usefully be employed. Preferably a vanadium/cobalt catalyst is used. A mixture of vanadylacetoactonate and cobalt acetate is particularly effective. Optimum proportions of these metals appear to be about 1 atom of vanadium to 3 atoms of cobalt.

Proportions of catalyst which may be used in the process are for example from 10 to 10,000, preferably 100 to 2000 parts by weight (calculated as total metal) per million parts by weight of liquid phase.

The generally preferred gas for use in the process is essentially a mixture of oxygen and nitrogen, especially air. Depending upon the conditions it is sometimes advantageous to use mixtures containing more or less oxygen than is present in air. Thus nitrogen/oxygen mixtures containing from 5 to 95% by volume of oxygen may be used. The use of mixtures containing nitrogen is not essential to the invention, however, and pure oxygen can be used if desired.

Temperatures which may be employed in the process of the invention are for example from 30° to 120° C., preferably 55° to 95° C. Pressures may be for example from atmospheric up to 70 atmospheres, although 1 to 10 atmospheres is preferred and atmospheric pressure is adequate.

The oxidation may be carried out in two or more stages, at different temperatures, the temperature in the second or subsequent stage being preferably slightly lower (e.g. 10 to 20° C. lower) than in the first stage.

Batch-wise or continuous methods of operation may be used.

After carrying out the process the aliphatic alpha-omega dicarboxylic acid may be isolated by cooling the liquid phase to induce crystallization, and filtering off the product.

The process of the invention is advantageous in that it can be operated at or near atmospheric pressures and thus can be carried out without expensive equipment.

High yields of adipic acid are obtainable by the oxidation of "KA oil" in the process and by recycling liquors after separation of adipic acid it is possible to achieve almost complete oxidation of the "KA oil" without significant loss in the yield of adipic acid. In consequence of such complete oxidation catalyst-containing mother liquors after isolation of adipic acid may be recycled. Catalyst recoverey problems are thereby minimized.

The process is further advantageous in that it produces smaller amounts of by-products than the known processes. Thus the alpha-omega dicarboxylic acid produced from a given cyclo-aliphatic ketone contains smaller amounts of lower molecular weight dibasic acids than the known processes and is substantially free from other impurities. The product, which is easily induced to crystallize by cooling after completion of the oxidation, yields a filter-cake which does not retain much solvent so that wash liquor requirements are low and a high quality product is obtained.

When the process is carried out in stainless steel equipment under the preferred conditions corrosion is especially low.

The invention is illustrated but not limited by the following Examples 2, and 6–12. Examples 1, 3, 4, 5 are included for purposes of comparison. In all the examples the parts and percentages are by weight unless otherwise stated.

EXAMPLE 1

Comparative example using a manganese/copper catalyst 70.4 parts of cyclohexanone was charged to 226 parts of glacial acetic acid containing 0.45 part of manganese acetate and 0.6 part of copper acetate. The reaction mixture was heated to 90 to 93° C. and well agitated. A nitrogen/oxygen gas feed containing 80% oxygen was passed into the liquid reaction mixture at atmospheric pressure at a rate of 35 volumes of gas per volumes of reaction mixture per hour for a period of 10 hours. The oxygen in the off-gases during this period varied between 15 and 40%. The reaction mixture was cooled, the product filtered off and washed with 40 parts of glacial acetic acid. 12.8 parts of adipic acid, melting point 143–145° C. was obtained. Gas liquid chromatography of the mother liquors and workings as methyl esters showed a further 18 parts of adipic acid to be present and 3.2 parts of unreacted cyclohexane. The molar yield of adipic acid based on cyclohexanone consumed was thus 30%. The yields of glutaric acid and succinic acid were 13% and 5.5% respectively. Selectivity (defined as the percentage of adipic acid relative to the total adipic, glutaric and succinic acids) was 62%.

EXAMPLE 2

70.5 parts of cyclohexanone in 230 parts of glacial acetic acid containing 0.93 part of cobalt acetate and 0.36 part of vanadyl acetylacetonate was thoroughly agitated at 90–96° C. A gas mixture containing 80% oxygen and 20% nitrogen by volume was passed through the mixture at a rate of 15 volumes per volume of liquid reaction mixture per hour at atmospheric pressure for 9½ hours. During this time the oxygen content of the off-gases varied between 12 and 14%. The mixture was cooled and the product was filtered off and washed with 66 parts of glacial acetic acid, and the filter cake dried. 50.2 parts of adipic acid, melting point 146–149° C. was obtained. 2.9 parts of cyclohexanone was found to be unreacted. The total molar yield of adipic acid was 63%, the glutaric and succinic acid yields were 11.9% and 2.6% respectively on the cyclohexanone used. The selectivity was thus 81%.

In place of acetic acid in this example other aliphatic monocarboxylic acids may be used, particularly propionic acid.

The proportion by volume of oxygen in the gas mixture can be varied from 5% to 95%.

As a further variant the procedure may be carried out under a pressure of 10 atmospheres in an autoclave.

Examples 3, 4 and 5 are for comparison with Examples 6 and 7 to show the synergistic effect of the vanadium catalyst on the yields when either a cobalt salt or a cobalt, manganese salt mixture is used in conjunction with it.

EXAMPLE 3

Comparative example using a pure vanadium catalyst 71.7 parts of cyclohexanone in 220.5 parts of glacial acetic acid containing 1.44 parts of vanadyl acetylacetonate was heated to 95–98° C. and air passed, at atmospheric pressure, into the well stirred mixture at a rate of 90 volumes of gas per volume of liquid reaction mixture per hour for a period of 11 hours. During this period the oxygen in the off-gases varied between 4 and 11%. 12.3 parts of cyclohexanone was found to be unreacted. Only 5.8 parts of adipic acid, melting point 140–145° C. was isolated. The total yield of adipic acid, inclusive of that in the filtrates and wash, was found to be 29 parts or 33% molar yield on the cyclohexanone consumed. The selectivity was 81%.

EXAMPLE 4

Comparative example using a cobalt catalyst 70 parts of cyclohexanone in 225 parts of glacial acetic acid containing 1.24 parts of cobaltous acetate was heated to 75–80° C. and air passed into the well stirred mixture at atmospheric pressure at the rate of 80–85 volumes of gas per volume of liquid per hour for 10 hours. During this period the oxygen in the off-gases varied from 7 to 11%. 4.6 parts of cyclohexanone was present in the filtrates and wash. 40.4 parts of adipic acid, melting point 148–150° C. was isolated. The total molar yield of adipic acid based on cyclohexanone consumed was 55%. Selectivity was 74%.

EXAMPLE 5

Comparative example using a cobalt/manganese catalyst

Cobaltous acetate (0.6 part) and manganese acetate (0.6 part) was used as catalyst in 225 parts of glacial acetic acid to oxidize 70.2 parts of cyclohexanone. 84 volumes of air per volume of total liquid reaction mixture per hour was passed through the well stirred reactants at 80° C. for 8½ hours at atmospheric pressure. Off-gas analysis showed 1 to 4% oxygen present during the main reaction. Only 0.9 part of cyclohexanone remained unreacted. 12.3 parts of adipic acid, melting point 147–149° C. was isolated. The total molar yield of adipic acid based on cyclohexanone consumed was 26%, and the selectivity was 75%.

EXAMPLE 6

0.45 part of cobaltous acetate, 0.45 part of manganese acetate and 0.37 part of vanadyl acetylacetonate were added to 70.2 parts of cyclohexanone in 224 parts of glacial acetic acid. The conditions of the reaction were the same as in Example 5. After 4½ hours oxidation, during which the oxygen in the off-gases varied between 2 and 3½%, 3 parts of cyclohexanone was left unreacted. On cooling adipic acid separated and was filtered off at room temperature, washed with acetic acid to give 86.7 parts of wet cake and dried at 120° C. 50.4 parts of adipic acid, melting point 147–149° C. was obtained. Including the adipic acid in the filtrates and wash, the total molar yield based on cyclohexanone used was 62.5%. The selectivity was 88%.

EXAMPLE 7

70.2 parts of cyclohexanone in 225 parts of glacial acetic acid containing 0.91 part of cobaltous acetate and 0.37 part of vanadyl acetylacetonate was heated to 75° C. Air was passed into the reaction at a rate of 84 volumes per volume of liquid reaction mixture at atmospheric pressure for 10 to 11 hours. Oxygen content of the off-gas throughout the reaction was less than 9%. 59.2 parts of adipic acid, melting point 146–149° C., was isolated after cooling, filtration, washing and drying. 2.1 parts of cyclohexanone was found to be unreacted. The total molar yield of adipic acid was 69% based on the cyclohexanone consumed. Selectivity was 87.5%.

In a similar experiment at 95° C. the yield of adipic acid was 63% and selectivity 85%, in both cases the cobalt to vanadium atom ratio was 2.6:1. Increasing the latter to 3.5:1 at 95° C. gave a yield of 51% adipic acid, selectivity 71%; decreasing the ratio to 1.5:1 gave a yield of 55% adipic acid, selectivity 82%. Similarly when the catalyst ratio was as in Example 7 but the total metal was reduced from 1000 parts per million parts by weight of the liquid phase used in that example to 110 parts per million parts by weight of the liquid phase, a yield of adipic acid of 47%, selectivity 71% was obtained. Increasing the catalyst to 2,000 parts per million parts by weight of the liquid phase also reduced the yield of adipic acid and selectivity to 57% and 82% respectively.

EXAMPLE 8

This example when compared with Example 7 shows the advantage of starting the oxidation at a higher temperature in order to initiate the reaction and thereafter oxidizing at a lower temperature.

70.3 parts of cyclohexanone in 225 parts of glacial acetic acid containing 0.91 part of cobaltous acetate and 0.37 part of vanadyl acetylacetonate was heated to 80° C. and air was passed into the well stirred reaction mixture at a rate of 50 gas volumes per volume of liquid phase at atmospheric pressure for ½ hour. The reaction mixture was cooled to 65–70° C. and maintained in this range for a further 10 hours with the same air flow rate. The off-gas contained 2 to 3% of oxygen. 8.3 parts of cyclohexanone was found to be unreacted. 55.3 parts of adipic acid was isolated after cooling, filtering, washing and drying, with a melting point 147.5 to 150.5° C. 11.1 parts adipic acid was found to be present in the filtrates and wash. The total molar yield based on cyclohexanone consumed was 70%. Selectivity was 91%. Thus the yield is slightly better and the quality significantly better than obtained by the Example 7 procedure.

In a similar experiment to determine the lowest temperature which would support oxidation at atmospheric pressure, it was found that antoxidation was maintained at 60° C. but not at 50° C. The yield of adipic acid in this experiment (mean temperature 55° C.) was below optimum at 59%.

EXAMPLE 9

69.9 parts of cyclohexanone in 224 parts of glacial acetic acid containing 0.91 part cobaltous acetate, 0.37 part vanadyl acetylacetonate and 0.5 part cupric acetate was heated to 80° C. and air was passed into the well stirred reaction mixture at 65 volumes of gas per volume of reaction mixture per hour at atmospheric pressure for 9 hours. 1.8 parts of cyclohexanone was found to be unreacted and 59.7 parts of adipic acid, melting point 148.5–150.5° C. was isolated. The total molar yield of adipic acid based on cyclohexanone used was 70%. Selectivity was 84%.

EXAMPLE 10

0.4 part of ferrous acetylacetonate was substituted for the cupric acetate of the previous example in a similar experiment. The reaction lasted for 8 hours and left only 1.85% of the original cyclohexanone unreacted. The adipic acid isolated, 80% of the total formed, had a melting point of 148–149.5° C., the total molar yield on cyclohexanone used being 72%. Selectivity was 87%.

EXAMPE 11

76.8 parts of cyclooctanone in 248 parts of glacial acetic acid containing 1.18 parts of cobaltous acetate and 0.5 part of vanadyl acetylacetonate was heated to 75–80° C. and air was passed into the reaction mixture at atmospheric pressure at a rate of 77 volumes gas per liquid volume per hour for 10 hours. 46.9 parts of suberic acid, melting point 135–138° C. was isolated in the usual manner, 11.6 parts of cyclooctanone was found to be unreacted. The total molar yield of suberic acid based on the cyclooctanone used was 69%. The main by-product, pimelic acid, was produced in 6.9% yield. The selectivity on the total suberic, pimelic, adipic and glutaric acid made was 87%.

EXAMPLE 12

This example shows the application of this invention to the oxidation of a mixture of cyclohexanone and cyclohexanol.

35.5 parts of cyclohexanol and 34.2 parts of cyclohexanone in 234 parts of glacial acetic acid containing 0.91 part of cobaltous acetate and 0.37 part vanadyl acetylacetonate was oxidized for 12 hours by passing a 85% oxygen/nitrogen mixture at 11 volumes of gas per liquid volume per hour into the well stirred reaction mixture at 95–98° C. 37.9 parts of the mixed cyclohexanone/cyclohexanol remained of which 38% was cyclohexanone. 13.5 parts of adipic acid, melting point 148–150° C. was isolated. The total yield on the ketone and alcohol consumed was 56%. Selectivity was 76%.

EXAMPLE 13

28.2 parts of cyclohexanol and 42.1 parts of cyclohexanone in 224 parts of glacial acetic acid containing 0.91 part of cobaltous acetate and 0.37 part of vanadyl acetylacetonate was oxidized at 75° C. for 11 hours by passing air at atmospheric pressure at a rate of 80 volumes of gas per liquid volume per hour into the well stirred mixture. 11.8 parts of mixed cyclohexanol/cyclohexanone remained of which 32% was cyclohexanone. 49.3 parts of adipic acid, melting point 149 to 152° C. was isolated. The total yield of adipic acid on the ketone and alcohol consumed was 72%. Selectivity was 89%.

EXAMPLE 14

34.9 parts of cyclohexanone and 33.2 parts of cyclohexanol in 225 parts of glacial acetic acid containing 0.91 part of cobaltous acetate, 0.37 part of vanadyl acetylacetonate and 0.9 part of ferrous acetylacetonate was oxidized in the same way as in Example 13. 18 parts of mixed cyclohexanone/cyclohexanol remained of which 32% was cyclohexanone. The total yield of adipic acid on the ketone and alcohol consumed was 70% with a selectivity of 88%.

By the procedure described in this example a mixture of cyclohexanone and cyclohexanol obtained by oxidation of cyclohexane with air may be oxidized satisfactorily to adipic acid.

I claim:

1. A process for the production of an aliphatic α-ω-dicarboxylic acid which process comprises contacting a cycloaliphatic ketone selected from the group consisting of cyclohexanone and cyclooctanone in liquid phase with molecular oxygen gas in the presence of a catalyst consisting essentially of a mixture of a compound of vanadium and a compound of at least one metal selected from the class consisting of cobalt, iron, manganese and copper, the proportion of metals in said mixture being 1 atom of vanadium for each 0.1 to 10 atoms of other metals, said compounds being soluble in the liquid phase and the process being carried out at a temperature of 30° to 120° C. and a pressure of 1 to 70 atmospheres.

2. Process according to claim 1 wherein the cycloaliphatic ketone is in the form of a mixture with its corresponding alcohol.

3. Process according to claim 2 wherein said mixture is a product obtained by oxidation of a cycloalkane.

4. Process according to claim 1 wherein the liquid phase is a solution in acetic acid.

5. Process according to claim 4 wherein the vanadium and other metal compounds are selected from the class consisting of acetates, acetylacetonates and combinations thereof.

6. Process according to claim 5 wherein the catalyst consists essentially of vanadylacetylacetonate and cobalt acetate.

7. Process according to claim 1 wherein the proportion of metals in said mixture is 1 atom of vanadium for each 1 to 4 atoms of other metals.

8. Process according to claim 1 wherein the catalyst consists essentially of compounds of vanadium and cobalt in the proportions of about 1 atom of vanadium to 3 atoms of cobalt.

9. Process according to claim 1 carried out in successive stages wherein the temperature in the first stage is higher than the temperature in subsequent stages.

10. A process for the production of adipic acid which process comprises contacting with molecular oxygen gas a liquid phase consisting essentially of a mixture of cyclohexanone and cyclohexanol obtained by oxidation of cyclohexane, said contacting being carried out in the presence of a catalyst consisting essentially of a mixture of a compound of vanadium and a compound of at least one metal selected from the class consisting of cobalt, iron, manganese and copper, the proportion of metals in said mixture being 1 atom of vanadium for each 0.1 to 10 atoms of other metals, said compounds being soluble in the liquid phase and the process being carried out at a temperature of 30° to 120° C. and a pressure of 1 to 70 atmospheres.

11. Process according to claim 10 wherein the liquid phase is a solution in acetic acid.

12. Process according to claim 11 wherein the vanadium and other metal compounds are selected from the class consisting of acetates, acetylacetonates and combinations thereof.

13. Process according to claim 12 wherein the catalyst consists essentially of vanadylacetylacetonate and cobalt acetate.

14. Process according to claim 10 wherein the proportion of metals in said mixture is 1 atom of vanadium for each 1 to 4 atoms of other metals.

15. Process according to claim 10 wherein the catalyst consists essentially of compounds of vanadium and cobalt in the proportions of about 1 atom of vanadium to 3 atoms of cobalt.

16. Process according to claim 10 carried out in successive stages wherein the temperature in the first stage is higher than the temperature in subsequent stages.

References Cited

UNITED STATES PATENTS

| | | | |
|---|---|---|---|
| 3,551,300 | 12/1970 | Longley | 260—537 P X |
| 3,564,051 | 2/1971 | Haarer et al. | 260—537 P X |
| 3,390,174 | 7/1968 | Schultz et al. | 260—533 |
| 3,513,194 | 5/1970 | Yasui et al. | 260—531 |

FOREIGN PATENTS

| | | | |
|---|---|---|---|
| 738,808 | 10/1955 | United Kingdom | 260—531 |
| 1,026,725 | 4/1966 | United Kinkdom | 260—531 |

LORRAINE A. WEINBERGER, Primary Examiner

R. D. KELLY, Assistant Examiner

U.S. Cl. X.R.

260—537 P